(12) United States Patent
Zee et al.

(10) Patent No.: US 7,047,306 B2
(45) Date of Patent: May 16, 2006

(54) SYSTEM AND METHOD FOR PROVIDING INTERNET BROADCASTING DATA BASED ON HIERARCHICAL STRUCTURE

(75) Inventors: Dae-Hoon Zee, Seoul (KR); Yong-Hwa Kim, Incheon-shi (KR); Jun Hwang, Seoul (KR)

(73) Assignees: EGC & Co., Ltd., Seoul (KR); Mizi Research, Inc., Seoul (KR)

( * ) Notice: Subject to any disclaimer, the term of this patent is extended or adjusted under 35 U.S.C. 154(b) by 578 days.

(21) Appl. No.: 09/936,528

(22) PCT Filed: Jan. 17, 2001

(86) PCT No.: PCT/KR01/00072

§ 371 (c)(1),
(2), (4) Date: Sep. 14, 2001

(87) PCT Pub. No.: WO01/53958

PCT Pub. Date: Jul. 26, 2001

(65) Prior Publication Data

US 2002/0161829 A1    Oct. 31, 2002

(30) Foreign Application Priority Data

Jan. 17, 2000  (KR)  ................................ 2000-1953
Jan. 26, 2000  (KR)  ................................ 2000-3836

(51) Int. Cl.
*G06F 15/16* (2006.01)
(52) U.S. Cl. .................................................... 709/231
(58) Field of Classification Search ................ 709/203, 709/217–219, 227–228, 230–232, 223; 370/270
See application file for complete search history.

(56) References Cited

U.S. PATENT DOCUMENTS

| 5,774,660 | A | 6/1998 | Brendel et al. |
| 5,983,005 | A | 11/1999 | Monteiro et al. |
| 5,991,306 | A | 11/1999 | Burns et al. |
| 6,181,697 | B1 * | 1/2001 | Nurenberg et al. ......... 370/390 |
| 6,697,365 | B1 * | 2/2004 | Messenger .................. 370/390 |

OTHER PUBLICATIONS

RFC 1112—Host extensions for IP multicasting; 1989.*

* cited by examiner

*Primary Examiner*—Glenton B. Burgess
*Assistant Examiner*—Sean Reilly
(74) *Attorney, Agent, or Firm*—Hamre, Schumann, Mueller & Larson, P.C.

(57) ABSTRACT

A system and method for providing Internet broadcasting data based on hierarchical structure, which can reduce a bottleneck problem due to data congestion. The method for providing Internet broadcasting data includes the steps of; a) if a connection request signal is received from a first terminal, determining whether a number of terminals connected to a server is smaller than a threshold value; b) if the number of the terminals connected to the server is smaller than the threshold value, transmitting broadcasting data to the first terminal; and c) if the number of the terminals connected to the server is not smaller than the threshold value, leading the first terminal to try to connect a second terminal, wherein the second terminal is one of the terminals connected to the server.

2 Claims, 4 Drawing Sheets

SYSTEM AND METHOD FOR PROVIDING INTERNET BROADCASTING DATA BASED ON HIERARCHICAL STRUCTURE

TECHNICAL FIELD

The present invention relates to a system and method of providing Internet broadcasting data based on hierarchical structure; and, more particularly, to on internet broadcasting system and method capable of reducing a bottleneck problem due to data congestion.

BACKGROUND ART

Generally, in an Internet broadcasting, a main server, which provides Internet broadcasting data, transmits multimedia data to all terminals connected to the server itself. Many Internet users receive the broadcasting data, such as moving pictures and audio data, etc., by connecting to the Internet broadcasting server That is, according to the current Internet broadcasting system, all of users may connect to the main server regardless of the number of users.

With speedy multimedia technology development, an amount of transmitting data increases, thereby happening a bottleneck problem and down of the server.

Especially, in case of the Internet broadcasting, an increasing of data capacity is necessary because quality of video and audio data affects competitiveness. To provide good quality of Internet broadcasting in the above-mentioned situation, efficiency and capacity of server should be increased.

Even though the server has good efficiency and large capacity, when many users are connected to the server, other users who want to connect to the server may not connect to the server. Even if a user may connect to the server, data transmission rate slow down, so that the good quality of broadcasting cannot be provided.

Also, if the above-mentioned situation happens repeatedly, or many users of which number is larger than a threshold value are tried to connect to the server at the same time, the server is downed and the Internet broadcasting may not be provided until the server is repaired.

Generally, in an Internet, data transmission is carried out by using a transmission control protocol/Internet protocol (TCP/IP) or a user datagram protocol (UDP).

To perform an Internet broadcasting by using the TCP/IP or the UDP, the same data have to be transmitted to the terminal as many times as the number of the terminals.

An IP multicasting is used to solve the above-mentioned problem. An IP multicasting is an Internet standard, which is made for broadcasting multimedia data such as moving picture data and audio data, and thereby establishing a special Internet address domain, so called "class D". Also, among the address of the domains, if a terminal receives data, then the data is transmitted to all terminals having the same address.

However, if an Internet router to which a terminal is connected does not support the IP multicasting, it only can be used in a local area network (LAN) to which the terminal is connected. Particularly, the server and the terminal in an Internet have to pass multiple Internet routers to connect each other, so among the routers, if one router doesn't support the IP multicasting, the terminal can not receive the broadcasting data from the server.

Moreover, the IP multicasting supporting routers are not provided sufficiently, the Internet broadcasting using the IP multicasting is practically impossible. With this reason, the Internet broadcasting which uses the IP multicasting is rate until now, and it is currently used in only an intranet system within an enterprise.

Currently, most Internet broadcasting servers use the TCP/IP or the UDP instead of the IP multicasting to thereby receive broadcasting data by directly connecting to a server and a terminal.

The above-mentioned Internet broadcasting method gives large communication load to the server and has difficulty in the number of the users connected to the server cannot be increased. Also, an access denial by the overload of the server, a data lost, a decreasing of communication speed and a down of a server may be brought about, thereby utilizing an expensive server equipment having a high capacity.

DISCLOSURE OF INVENTION

It is, therefore, an object of the present invention to provide an Internet broadcasting system and method capable of reducing a bottleneck problem caused by data congestion It is, therefore, another object of the present invention to provide an Internet broadcasting system and method capable of providing an Internet broadcasting without downing of a server by restricting the number of the terminals, regardless of the number of the users who connects to the server at the same time.

In accordance with one aspect of the present invention, there is provided a method for providing Internet broadcasting data, comprising the steps of: a) if a connection request signal is received from a first terminal, determining whether a number of terminals connected to a server is smaller than a threshold value; b) if the number of the terminals connected to the server is smaller than the threshold value, transmitting broadcasting data to the first terminal; and c) if the number of the terminals connected to the server is not smaller than the threshold value, leading the first terminal to try to connect a second terminal wherein the second terminal is one of the terminals connected to the server.

In accordance with another aspect of the present invention, there is provided a method for providing Internet broadcasting data, comprising the steps of: a) transmitting a connection request signal to an Internet broadcasting server; b) determining whether the received signal from the Internet broadcasting server is broadcasting data or a re-connection leading signal: and c) if the signal received from the Internet broadcasting server is the broadcasting data, displaying the received broadcasting data.

In accordance with further another aspect of the present invention, there is provided an Internet broadcasting system, comprising: a determining means for determining a number of terminals connected to the server are larger than a threshold value when receiving a connection request signal from a first terminal; a transmission means for transmitting broadcasting data to the first terminal when the number of terminals connected to the server are smaller than the threshold value; and a control unit for leading the first terminal to a second terminal which is already connected to the server, when the number of the connected terminals are over the threshold value.

In accordance with still further another aspect of the present invention, there is provided an Internet broadcasting system comprising: a connection request means for requesting a connection to an Internet broadcasting server; a receiving means for transmitting a re-transmitting leading signal to the connection request means when a re-connection leading signal is received from the Internet broadcasting server and for transmitting a broadcasting data to be displayed when the broadcasting data is received from the Internet broadcasting server; a display means for displaying the broadcasting data received from the receiving means; and a repeating means for transmitting the broadcasting data to the first terminal by receiving the broadcasting data from the broadcasting receiving means, according to the repeating request signal of the first terminal.

BRIEF DESCRIPTION OF THE DRAWINGS

The above and other objects and features of the present invention will become apparent from the following description of the preferred embodiments given in conjunction with the accompanying drawings, in which.

BEST MODE FOR CARRYING OUT THE INVENTION

Hereinafter, embodiments according to the present invention will be described in detail referring to the accompanying drawings.

In a first embodiment, it will be described an Internet broadcasting system and method based on hierarchical structure without regarding a protocol. In a second embodiment, it will be described an Internet broadcasting system and method which transmits a broadcasting data by using an IP multicasting.

EMBODIMENT 1

Figure 1:
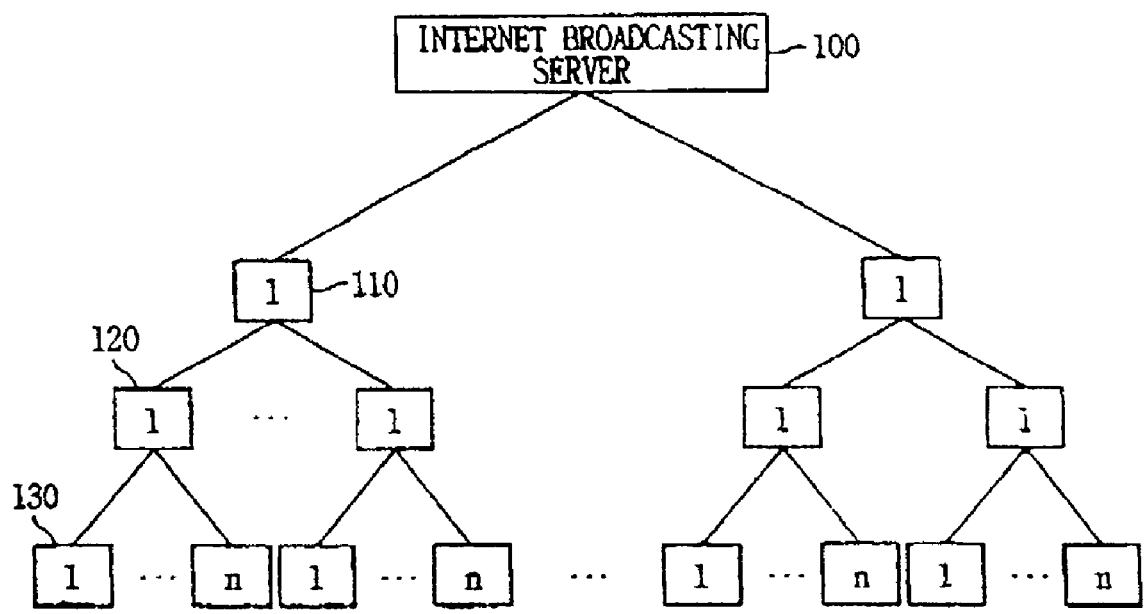
FIG. 1 is a diagram illustrating an Internet broadcasting system based on hierarchical transmission in accordance with the present invention.

FIG. 1 as a diagram illustrating an Internet broadcasting system based on hierarchical transmission in accordance with the present invention. As shown in FIG. 1, the system includes an Internet broadcasting server 100, and terminals 110, 120, 130 that connect to the server 100 or the terminal 110 connected to the server 100 to receive data.

For clear description, the terminal directly connected to the server will be called as a primary connection terminal, the terminal connected to the primary connection terminal will be called as a secondary connection terminal and the terminal connected to the N-1$^{th}$ connection terminal will be called as N$^{th}$ connection terminals. At this time, N is an optional integer which is equal to or larger than two (2).

Figure 2:
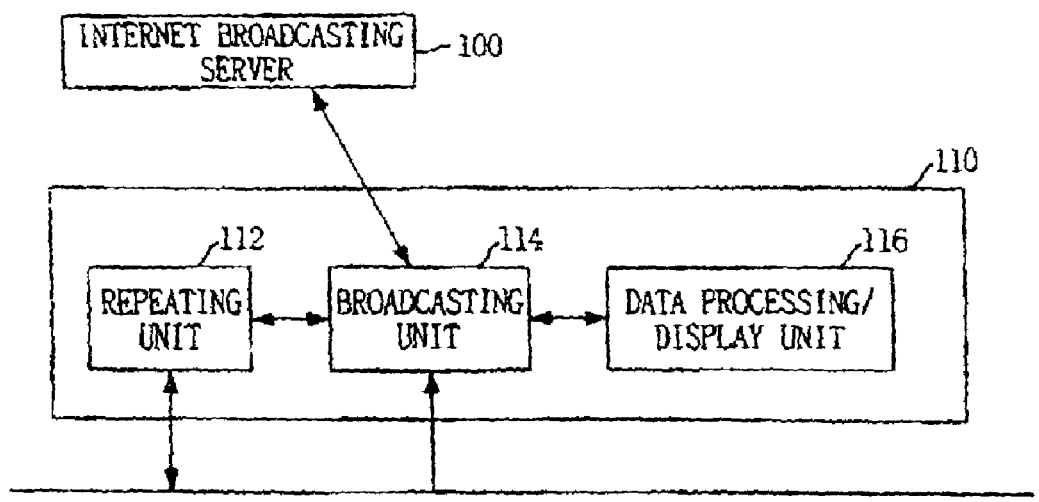
FIG. 2 is a diagram showing a terminal adapted to an Internet broadcasting system in accordance with the present invention.

Referring to FIG. 2, the terminal 110, 120 or 130 includes a broadcasting receiving unit 114 for receiving data transmitted from the Internet broadcasting server 100 or the terminals 110 and 120. A data processing and display unit 116 outputs and treats data received through a broadcasting receiving unit 114. A broadcasting repeating unit 112 repeats a broadcasting data by connecting to the Internet broadcasting server 100 by using the TCP/IP or the UDP protocol to receive the broadcasting data, and transmits the received data to other adjacent terminals.

To carry out Internet broadcasting in the above-mentioned network, software is installed to the terminal 110 to form the broadcasting repeating unit 112, the broadcasting receiving unit 114 and a broadcasting data processing and display unit 116.

The broadcasting repeating unit 112 connects to the Internet broadcasting server 100 by using the TCP/IP or the UDP, receives a broadcasting data from the Internet broadcasting server 100, then transmits the broadcasting data to the other terminals 120 that request connection to the terminal 110.

The broadcasting receiving unit 114 receives the broadcasting data transmitted from the Internet broadcasting server 100 or the terminal, then transmits it to the broadcasting data processing and display unit 116.

The broadcasting data processing and display unit 116 displays a moving picture on a monitor of the terminal or carries out an audio processing. It receives a broadcasting data from the broadcasting receiving unit 114, processes the received data, and than displays the received data to monitor or other devices.

Referring to the Internet broadcasting receiving or repeating process by using the secondary connection terminal 120, when the broadcasting receiving is started, the broadcasting receiving unit 114 receives a broadcasting data and transmits it to the data processing and display unit 116.

Figure 3:
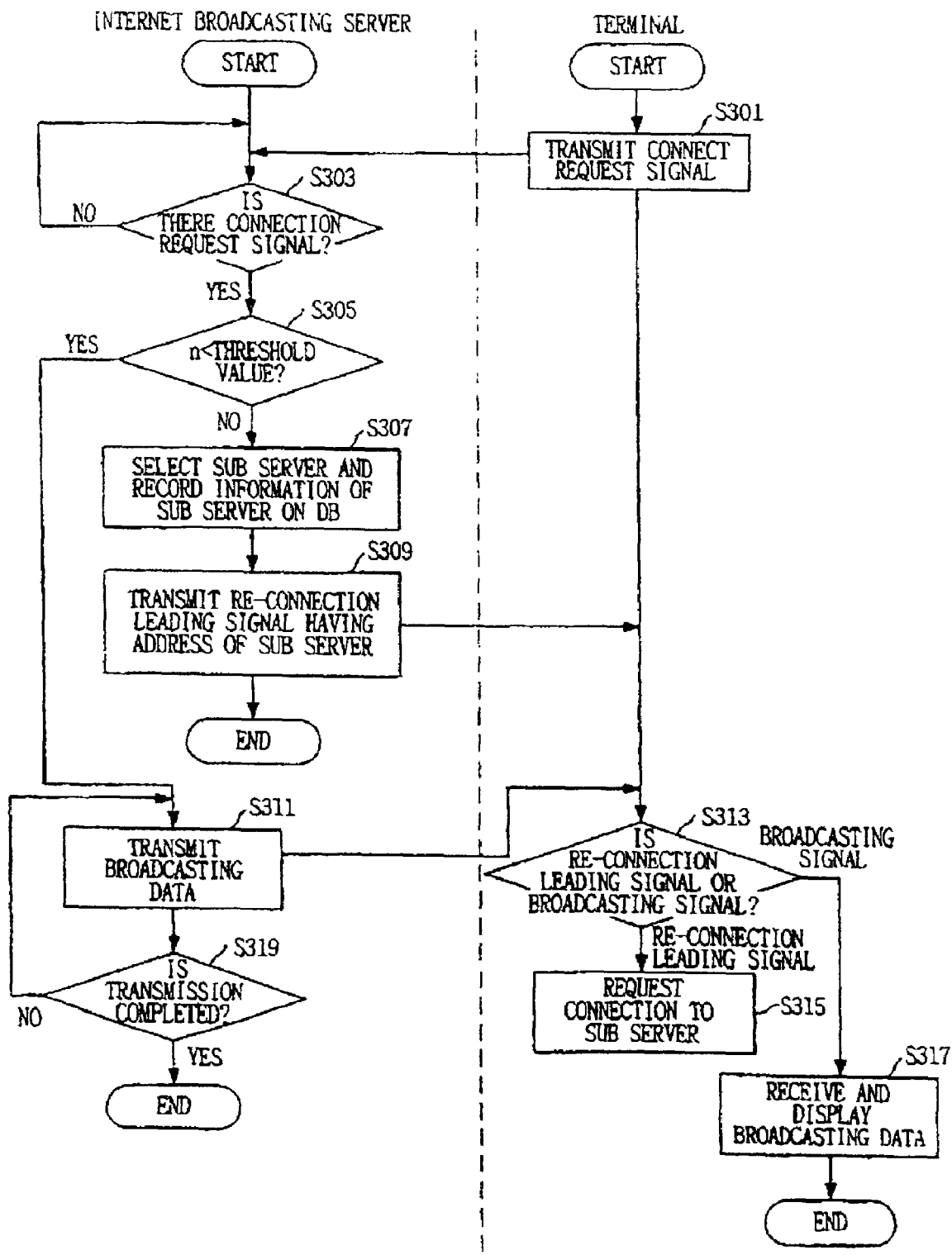
FIG. 3 is a diagram showing an Internet broadcasting method by using hierarchical transmission in accordance with the present invention.

FIG. 3 is a diagram showing an Internet broadcasting method based on hierarchical transmission in accordance with the present invention.

First, the Internet broadcasting server provides multimedia data, and limits the number of the primary connection terminals as much as it can provide best quality of broadcasting. That is, the Internet broadcasting server maintains a broadcasting quality considering system efficiency and data capacitance, and establishes a threshold value that indicates the maximum number of connectable users to the server.

When the server receives a connection request signal from the terminal, at step S305, determining whether the number of terminals connected to the server are smaller than the threshold value, at step S311, and if so, connection is admitted and the broadcasting data is transmitted.

At step S319, determining whether the transmission is completed, and if completed, the process ends, otherwise, returns to the step S311.

At step S305, if the number of connected terminals is larger than the threshold value, the Internet broadcasting server prevents the terminal from connector to itself and leads the terminal to be connected to one of the primary terminals 110. That is, at the step S305, one of the primary connection terminals, which are already connected to the server, is selected as a subordinate server and recorded into a database. The Internet broadcasting server stores information related to the terminals directly or indirectly connected to itself, such as an address of the primary connection terminal, and the number and an address or the secondary terminals which are connected to the primary connection terminals.

At step S309, a re-connection leading signal having the address of the subordinate server is transmitted to the connection request terminal to thereby induce re-connection to the subordinate server.

At the step S305, when the terminal trying the connection to the server receives a signal from the server, the terminal determines whether the received signal is broadcasting data or a re-connection leading signal At step S317, if the received signal is the broadcasting data, the terminal displays the broadcasting data on a display unit, otherwise, at step S315, the terminal transmits a connection request signal to the primary connection terminal based on the received address included in the re-connection leading signal.

When the number of the terminals trying to be connected to the server is larger than the threshold value, the server leads the terminal, which tries to be connected to the server, distributed to be connected to the primary connection terminals.

The primary connection terminals connected to the server, receives a broadcasting data from the server and displays it to the user, and applies connection of the terminals. In case the connection of the terminals are impossible, the primary connection terminals leads the terminals to be connected to one of the secondary terminal, which is already connected to the primary connection terminal.

At this time, the primary, the secondary and the following terminals have functions of receiving data by connecting to the server or the higher level terminals, and repeating the received data to the subordinate terminals. Also, each terminals limits the number of terminals connected to itself in a scope of without decreasing broadcasting quality by data receiving and repeating transmission.

The secondary connection terminal connected to the primary connection terminal receives broadcasting data from the primary connection terminal and displays it to a user, then permits connection request terminals, which the re-connection are led by the server, to be connected to itself.

With repeating of the above process, a connection from the server is led and Nth connection terminal connected to a N-1th connection terminal receives the broadcasting data from the N1th connection terminal and displays it to a user, and allows the connection request of the terminals led by the server. In case the connection to the server is impossible, the server induces the connection to one of the connection terminals which is already connected.

If the broadcasting data cannot be received for a while just after or on the way of receiving the broadcasting data, a repeating request signal is generated and transmitted to the broadcasting repeating unit 112 within the terminal. When the broadcasting repeating unit 112 receives the repeating request signal, it directly connects to the Internet broadcasting server 100 instead of the primary connection terminal 110, and broadcasts the broadcasting data to the other terminals by receiving the broadcasting data based on TCP/IP or the UDP.

The broadcasting data transmitted from the repeating unit 112 is transmitted not only to the receiving unit 114 equipped within the terminal, but also to a receiving unit of other terminals connected to the same local area network (LAN). Likewise, the broadcasting data may be transmitted to a terminal of other area, which is connected by using a router m.

As described above, the Internet broadcasting system and method in accordance with the present invention make it possible to connect a predetermined number of terminals, and leads the terminals, which tries to connect to the server when the predetermined number of the terminals are already connected to the server, to be connected to the subordinate terminal. Accordingly, lower level terminals can receive the broadcasting data with same speed, thereby being capable of providing a large capacity broadcasting without increasing of capacity of a server and overload.

In the present invention, the server is set as a root and limits the number of terminals to be connected to the server itself. In case that many terminals of which number is larger than the predetermined number of requested connection to the server, the server leads the terminal requesting the connection to be connected to one of the already connected terminals, such that the already connected terminals plays a role of the repeater and transmits the broadcasting data. Therefore, without increasing server capacity, good quality of broadcasting may be provided to the Internet broadcasting users.

Also, the limitation of the number of the terminals connected to the server or the terminal prevents bottleneck problem in data transmission or down of server.

EMBODIMENT 2

Figure 4:
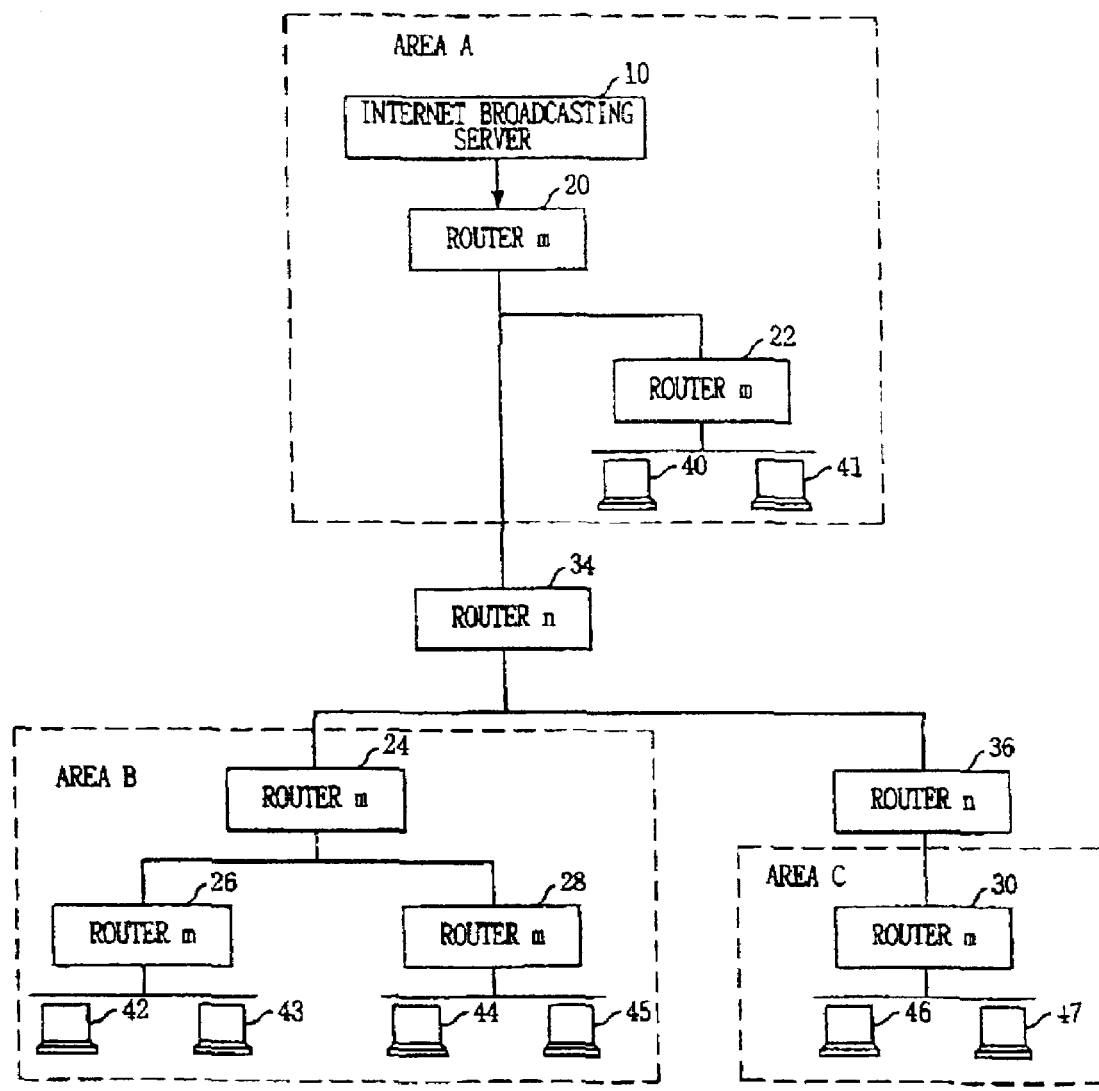
FIG. 4 is a network diagram illustrating an Internet broadcasting system by using distributed IP multicasting method in accordance with the present invention.

FIG. 4 is a diagram illustrating an Internet broadcasting network by using distributed IP multicasting method in accordance with the present invention First, referring to FIG. 4, a distributed IP multicasting method for Internet broadcasting system in accordance with the present invention includes an Internet broadcasting server 10 for broadcasting multimedia data such as a video and an audio, and terminals to 47 for repeating a received data to adjacent terminals by receiving broadcasting data and connecting to the Internet broadcasting server 10 through TCP/IP or UDP protocol to thereby display the data to a user, and multiple IP multicasting routers (router m) 20 to 30 which have an IP multicasting function to connect the Internet broadcasting server 10 and terminals 40 to 47 to the Internet.

In here, different from the router m, a general router (router n) 34 and 36 which have not had the IP multicasting function, and the IP multicasting data between two networks, which are connected by the router n is not transmitted.

An operation of the distributed IP multicasting method for Internet broadcasting system in accordance with the present invention will be described with another embodiment of the present invention and an Internet broadcasting method by using the distributed IP multicasting.

As described in FIG. 4, when an Internet communication region which can be connected by the IP multicasting routers 20 to 30 are divided to regions A, B and C, and different from the terminals 40, 41 in region A, the terminals in B and C regions can not directly receive the IP multicasting data of the Internet broadcasting server 10. Accordingly, the terminals in B and C region can receive the broadcasting data by using TCP/IP or UDP protocol. At this time, each of one terminal 43 and 47 in B and C regions connect to the server to receive data and transform the data to the IP multicasting data for transmitting the data to the other terminals with in same region, then other terminals in B and C regions receive the IP multicasting data.

In the above-referenced network, terminals for performing an Internet broadcasting by using the present invention is similar to the before mentioned terminal 110, as shown in FIG. 2.

The function performed in each of function block is similar to that of shown in FIG. 2. The terminal includes a broadcasting repeating unit 112, a broadcasting receiving unit 114 and the broadcasting data processing and display unit 116 and the IP multicasting protocol is used. The functional block may be realized as software and the functional block may be installed by receiving from the Internet broadcasting server with the broadcasting data or before receiving the broadcasting data.

The broadcasting repeating means 112 is programmed to have a broadcasting transmission function. It connects to the Internet broadcasting server 10 by using TCP/IP or UDP and the broadcasting data is received for transforming it to the IP multicasting data, then transmit it to the other adjacent terminals.

The data treatment and display means 116 receives broadcasting data from the broadcasting receiving means 114 and treats the data for displaying it to a monitor and other devices.

The Internet broadcasting receiving and transmission process with the terminal 40 will be described.

When the terminal 40 receives a broadcasting data, the broadcasting receiving means 114 receives the data by using the IP multicasting and transmits the data to the data treatment and display means 116.

If the IP multicasting data is not received for a predetermined period of time, the broadcasting repeating means 112 is directly connected to the Internet broadcasting server 10 for receiving the data by using TCP/IP or UDP and transmits the data to the adjacent terminal after transforming the data to the IP multicasting data.

The data, received from in the broadcasting repeating means 112 can reach to the other broadcasting-receiving unit of a terminal connected to a local area network (LAN). Also, the data can be transmitted to the other terminals in other regions by using the router m.

Referring to FIG. 4, a region A can receive an IP multicasting data from an Internet broadcasting server 10, but the regions B and C need optional broadcasting transmission function.

A terminal 43 in region B and a terminal 47 in region C carry out the broadcasting transmission function. They receive broadcasting data directly from the Internet broadcasting server 10 by using TCP/IP or UDP and transmit the data to the adjacent terminals by using the IP multicasting.

Therefore, in FIG. 4, among the eight terminals 40 to 47, if the two terminals 43 and 47 are connected to the internet broadcasting server 10, then all of the terminals 40 to 47 can receive an equal broadcasting, at the same time.

With the above-mentioned method, a region which is difficult in performing the IP multicasting, can directly connected to the internet broadcasting server 10 by using TCP/IP or UDP and the terminals 43 and 47 transform the data to the IP multicasting data to re-transmit it to the adjacent terminals.

The distributed IP multicasting method for internet broadcasting system can reduce transmission load in server by directly transmit data to a smaller number of terminals and increase number of terminals which can receive a broadcasting with the IP multicasting.

Especially, the method is advantageous in an enterprise which using an Intranet because it can decrease loads in network and server.

While the present invention has been described with respect to the particular embodiments, it will be apparent to those skilled in the art that various changes and modifications may be made without departing from the scope of the invention as defined in the following claims.

The invention claimed is:

1. An Internet broadcasting method comprising:
providing an Internet broadcasting server configured to broadcast unicast data and multicast data;
providing a terminal having broadcasting receiving means to directly receive multicast data, and data treatment and display means connected to the broadcasting receiving means for receiving, processing, and displaying the multicast data from the broadcasting receiving means, and broadcasting repeating means to directly receive unicast data, transform the unicast data to multicast data and transmit the transformed multicast data to other terminals;
receiving by the broadcasting receiving means multicast data broadcast by the Internet broadcasting server for a first time period;
receiving, processing, and displaying, the multicast data from the broadcasting receiving means by the data treatment and display means;
failing to receive multicast data by the broadcasting receiving means for a predetermined second time period after the first time period and then directly connecting the broadcasting repeating means of the terminal to the Internet broadcasting server and receiving unicast data from the Internet broadcasting server, transforming the received unicast data into multicast data, and transmitting the transformed multicast data to other terminals connected to the terminal.

2. A computer readable recording media recorded with a program for executing the method defined in claim 1.

* * * * *